G. H. HINES.
MOTOR POWER STUMP PULLER.
APPLICATION FILED SEPT. 5, 1918.
1,369,657.
Patented Feb. 22, 1921.
3 SHEETS—SHEET 1.
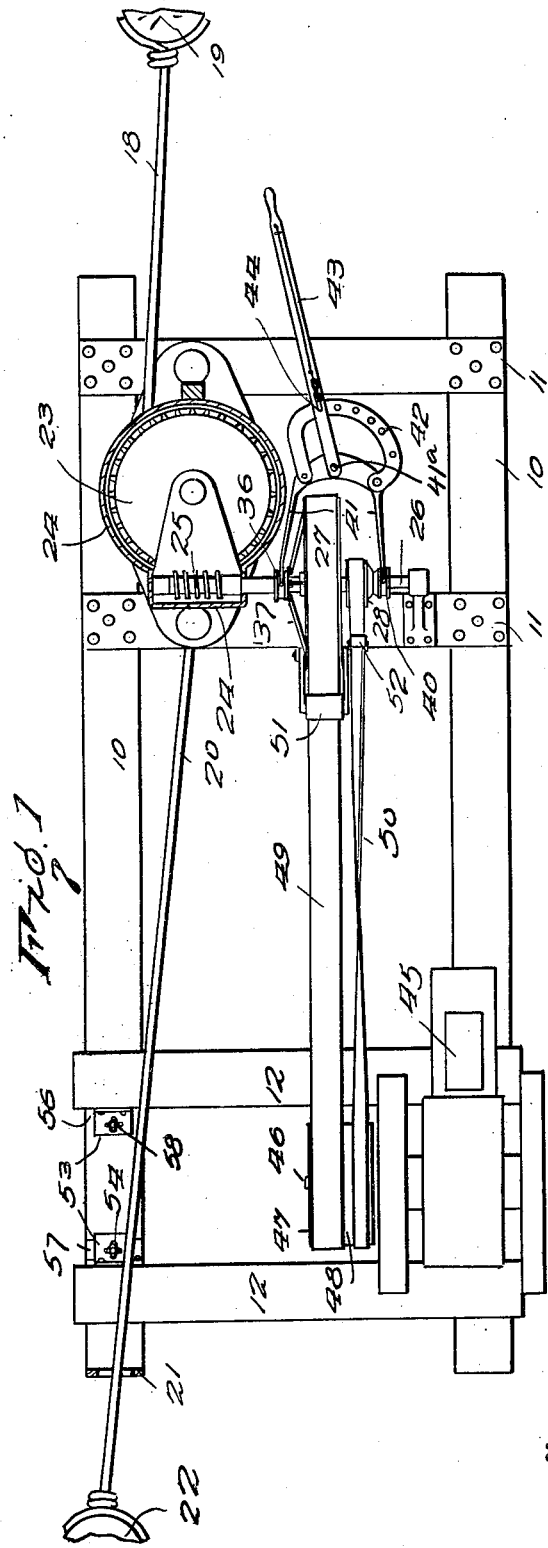
Gail H. Hines, Inventor
By Geo. P. Kimmel
Attorney

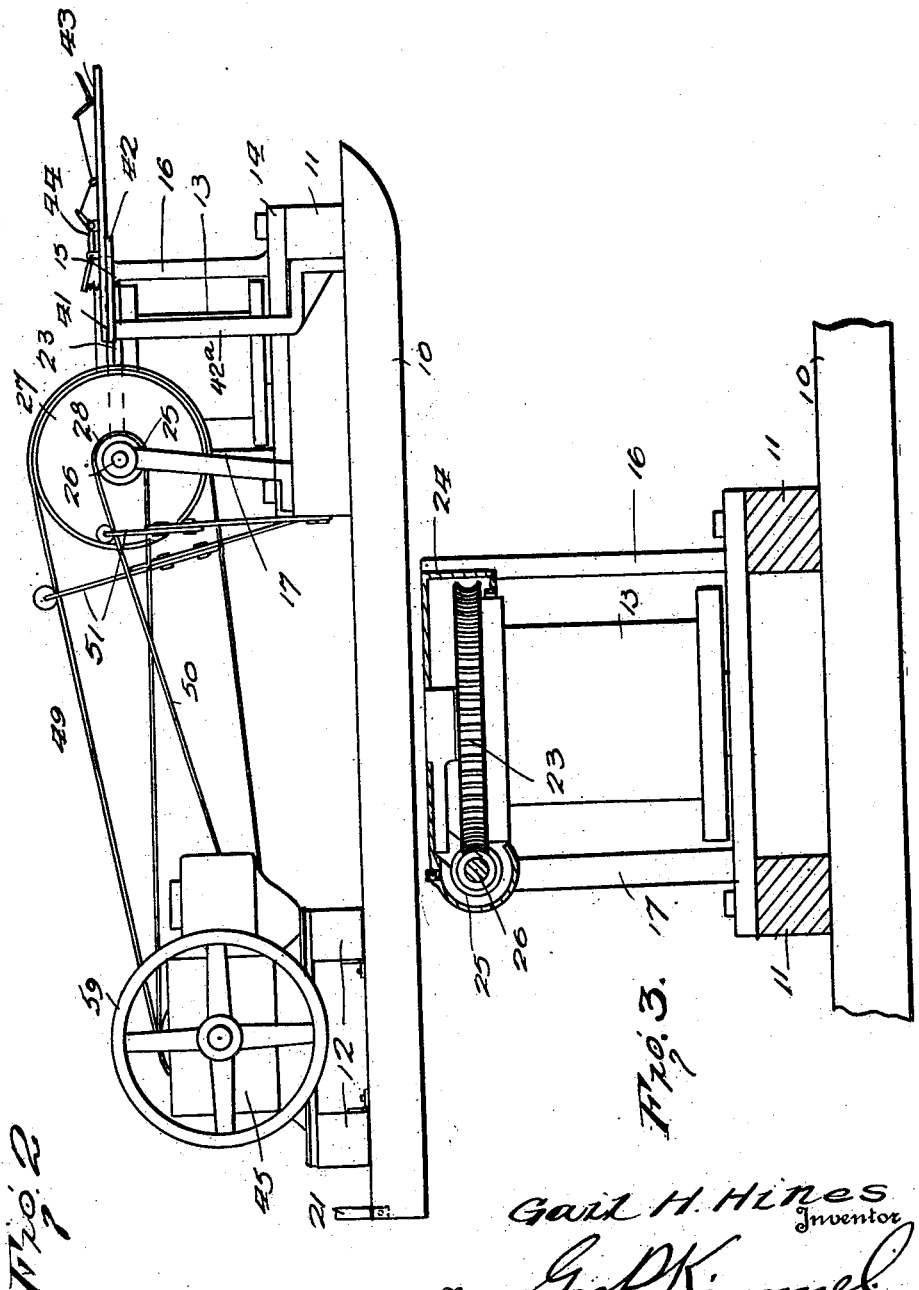

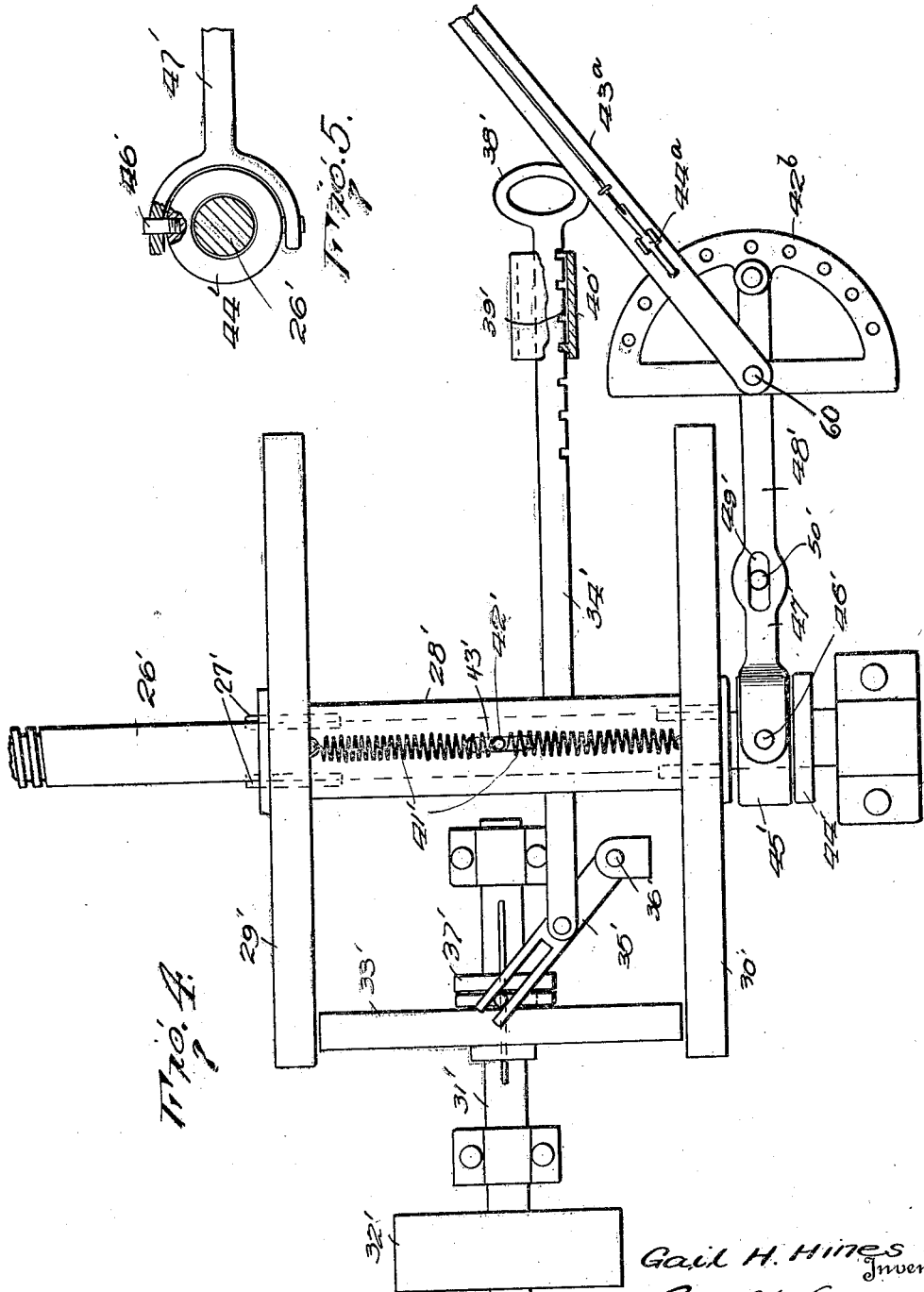

UNITED STATES PATENT OFFICE.

GAIL H. HINES, OF BEAVERTON, MICHIGAN.

MOTOR-POWER STUMP-PULLER.

1,369,657.  Specification of Letters Patent.  Patented Feb. 22, 1921.

Application filed September 5, 1918. Serial No. 252,738.

*To all whom it may concern:*

Be it known that I, GAIL H. HINES, a citizen of the United States, residing at Beaverton, in the county of Gladwin and State of Michigan, have invented certain new and useful Improvements in Motor-Power Stump-Pullers, of which the following is a specification.

This invention relates to the class of stump pullers and more particularly to stump pullers of the vertical drum type.

The primary object of the invention is to improve the construction and efficiency of stump pullers of the type mentioned, by equipping the same with motor power actuating means, whereby the capacity of the machine is enlarged, as well as the expense of operation and maintenance reduced and the convenience of operation and control greatly facilitated.

A further object of the invention is to provide a stump puller which is portable and which includes a vertical drum having a cable for anchoring the same and a second cable to attach to stumps to be pulled, a motor being connected with the drum in an operative way, to impart rotation thereto in opposite directions for pulling stumps, or for releasing the stump pulling cable to quickly repeat the pulling operation, novel means being provided to cause the operation of the drum and puller as a whole, and for controlling the operation thereof and the pulling cable, by a single attendant.

With the above objects and other objects in view, as will appear as the description proceeds, the invention consists of the novel features of construction, combination of elements and arrangement of parts which will be more fully described herein and set forth with particularity in the claims appended hereto.

Reference is had to the accompanying drawings forming a part of this application, in which like reference characters will indicate corresponding parts throughout the several views, in which—

Figure 1 is a plan view of my improved motor power stump puller,

Fig. 2 is a side elevation thereof,

Fig. 3 is a vertical sectional view of the stump puller enlarged,

Fig. 4 is a plan view showing a modified form of drive mechanism for reversing the direction of rotation and varying the speed and power of the drum, and Fig. 5 is a detailed view of the controlling means therefor.

Referring to the drawings in detail, my improved stump extractor or puller is shown mounted upon suitable transporting means, which may be in the form of a skid sled comprising runners 10 having suitable transverse or connecting braces 11 rigidly connecting said runners and holding the same in spaced relation, at their forward ends. At their rear ends, said runners are preferably connected by cross braces 12, the connection thereof with the runners being of novel construction, as will be hereinafter particularly pointed out, in order to permit adjustment of the motor with respect to the pulling device, as will be also explained, in order to loosen or tighten the drive belts as will later appear.

Broadly, the invention consists is applying mechanical power to the vertical drum type of stump puller and as shown in the drawings, 13 designates the drum suitably journaled in the frame, including the base portion 14 and a top plate 15, providing posts 16 and 17, around the former of which the pulling cable 18 is designed to extend, for winding the same upon the drum 13 for facilitating the operation of pulling the stumps, designated at 19. The anchoring cable is designated at 20, and is attached to the post 17 and extends rearwardly over one corner of the skid or boat, and through a guide loop 21 arranged at the rear end of one of the runners 10 at that side, for connection with a suitable anchor, which may take the form of a tree designated at 22.

In lieu of the ordinary sweep employed in stump pullers I suitably attach or bolt to the top of the vertical drum, a relatively large worm gear 23 suitably inclosed by a casing or housing 24 together with a worm 25 in mesh with said worm gear, the housing or casing being designed to contain suitable grease for lubrication, such grease being designed to be injected through a suitable plugged opening in the casing, as is common in the art of gearing. This casing or housing also serves to exclude sand and dust from the gearing and therefore the latter will be thoroughly lubricated to insure efficiency in the running and operation of the puller, as well as lubricating the bearings for the drum, and particularly the upper one thereof. It is also to be understood that the thrust bearing on the worm is properly associated with the casing on the puller frame and that ordinary methods of oiling may be employed, within the scope of the invention, as shall be necessary to the proper operation of the machine, in addition to the features herein described, and as will be subsequently claimed.

The worm shaft 26 projects to one side and has loosely mounted thereon a large pulley 27 and a small pulley 28, the large pulley being for power and the small pulley for speed in reversing the winding of the cable, as will be hereinafter pointed out.

Coöperating with the inner face of the rim of the smaller pulley 28, are a plurality of shoes or clutch members 38 normally disengaged by coil springs 39 and adapted to be moved into engaged position by means of a shifting member in the form of a tapered collar 40 also splined on the shaft 26 and adapted to be shifted simultaneously with the shifting of the collar 36, but in an opposite direction to the direction of shifting the latter. For this purpose, there is provided a yoke 41 having spaced forks for engaging the grooves of the collars 36 and 40 while at the same time straddling the pulleys, as is clearly shown in Fig. 1 of the drawings. The yoke is pivotally secured at 41ᵃ to a post 42ᵃ carried by the supporting frame and rigidly connected at spaced points to an apertured sector or segment 42. A hand lever 43 is pivotally mounted at one end on the pivot 41ᵃ and is provided with a latch mechanism 44 to engage the apertures or notches of the sector, whereby the lever can be swung into various angular positions with relation to the yoke 41 for convenience of manipulation by the operator or attendant and at the same time permitting the lever to be locked with the yoke for the purpose of shifting the collars to engage or disengage the clutch members alternately, as heretofore pointed out. This lever is especially useful, when unwinding the cable from the drum, inasmuch as it may be shifted to the position shown in Fig. 1, while the small pulley is thrown in operation to reverse the operation of the drum at high speed, and one hand may be used for pulling the cable 18 from the drum, as it is unwound, while holding the lever with the other. It is also to be understood that the throw lever or clutch lever is so constructed that it can be instantly moved and locked in a convenient position and as the lever is so mounted as not to be thrown past the dead center, to automatically hold the clutch engaged. This will greatly facilitate the pulling operation, inasmuch as a stump pulling operation is intermittent work and the clutch will disengage, the moment that the lever is released and pressure is removed from the collars. In this way, the clutch may be allowed to slip in starting the stump from its socket thereby avoiding quick jerks upon the cables, as would be likely to break the same or injure the mechanism, and rendering the device capable of being kept under control so as to exert the proper strain or pull at all times.

In order to drive the shaft 26 for the purpose of winding the drum, a suitable motor 45, preferably of the internal combustion type, or other prime mover, is supported upon the cross beams or braces 12 at the rear of the sled opposite to the loop 21 and has arranged upon the drive shaft 46 thereof, a pair of pulleys 47 and 48, a belt 49 being trained around the pulleys 27 and 47 and a belt 50 being trained around the pulleys 28 and 48, the latter belt being suitably crossed, so as to impart reverse rotation to the shaft 26, for unwinding the drum, at high speed, while the belt 49 is for the purpose of imparting rotation to the drum for winding the cable 18 thereon, in the pulling operation, at low speed, suitable belt tighteners 51 and 52 being provided for the respective belts, as shown. In order to tighten the belts, the cross braces or beams 12 supporting the motor or prime mover, are capable of adjustment along the runners or transporting frame produced thereby, which adjustable connection is more particularly shown in Fig. 1 of the drawings. In this connection, it should be noted that hinges 53 have the plates thereof connected to the upper faces of the runners and the adjacent vertical faces of the cross braces, the vertically extending plates or leaves being rigidly connected to the cross braces or beams by bolts, lag screws or the like, while the plates disposed against said runners are slotted longitudinally as shown at 54. These slots extend longitudinally of said leaves or plates, while the runners are cut out transversely, over which are arranged plates 56, the same being countersunk and disposed with the slots 57 thereof over the cutout portions, so as to accommodate the heads of the bolts 58 adjustably connecting the hinges 53 for transverse and longitudinal adjustment upon the runners, whereby the braces 12 may be adjusted toward and away from the drum, to tighten or loosen the belt. Of course, inasmuch as the engine is provided with the usual fly wheel 59, smooth operation of the device will be provided for, the engine being under control in the ordinary way. In operation, the puller should swing around the anchor stump from right to left, a pole or plank thrown crosswise under the sled serving the purpose of permitting the latter to swing easily around the anchor as the stump is pulled. The power and speed of the puller is only limited by the size of the engine used, and it is to be understood that on very heavy work, snatch blocks or block and tackle may be used to secure more power and reduce the strain on the pulling cable. Advantages over the old form of puller having a sweep, are obvious, since it is not necessary to provide a road on which the animals must travel; it is unnecessary to provide a ratchet mechanism which must be thrown out of operation every time the cable is unwound from the drum or to throw the drum out of operation or gear and reverse the same by hand and the attendant has very little of the work to do, compared with the old method and therefore less help is needed for accomplishing a greater amount of work.

It is also desirable to provide means for quickly changing the speed and power of the extractor, and of course the motor may be provided with the ordinary mechanism for controlling the speed of rotation and the power derived therefrom through the throttling of the same, but in order to derive more power and less speed, the mechanism shown in Figs. 4 and 5 of the drawings is provided. It embodies the frictional drive principle, and in lieu of disposing the motor shaft to extend parallel with the worm shaft or transversely of the skid it is placed at one side of the latter or at right angles to said shaft, and in lieu of employing the double pulley arrangement, the worm shaft 26' has splined thereon through the medium of a series of longitudinal keys 27', a tubular shaft 28' carrying at its ends and fixed thereto, friction disks 29' and 30', the inner faces of which are covered with the desired frictional engaging surface. A drive shaft 31' having a pulley 32' is suitably driven from the motor shaft and carries a friction wheel 33' thereon. This wheel is splined on the shaft 31 and is adapted to be shifted through the medium of a handle bar 34' connected to a lever 35', pivoted as shown at 36', through a suitable bearing and engaged with the grooved collar 37' of the friction wheel 33', the handle bar or lever 34' having a suitable handle 38' and a projection 39' designed to engage a notched member 40', in order to hold the handle bar in adjusted position when shifting the friction wheel radially with respect to the friction disks so that when the friction wheel is brought into contact with the disks independently, as will be hereinafter pointed out, the speed of rotation of the shaft 26' and thus the speed of rotation of the drum, will be varied, that is made slower or faster.

The friction disks are held normally centralized through the medium of a pair of oppositely extending springs 41' connected to the respective disks adjacent to the hub portions thereof formed by the tubular shaft 28' and to a pin 42' connected to the shaft 26' and operable in a slot 43' in said tubular shaft, so as to permit shifting of the latter, the disks being normally centralized and out of engagement with the friction wheel but adapted to be shifted longitudinally or to translate on the shaft 26', without rotating independently thereof, so as to bring either of the disks into engagement with the friction wheel 33', for driving the shaft 26' in opposite directions, for pulling or releasing the cable.

As means for shifting the tubular shaft and friction disks, said tubular shaft is shown as provided with a grooved collar extension 44' receiving a loose collar 45' having oppositely extending pins 46' one of which is threaded, so as to retain an engaging fork 47' thereon. This fork is carried by a lever 48' slotted as shown at 49' and pivoted as shown at 50' to shift longitudinally as the distance between the pins 46' and the pivot 50' vary. The lever 48' is designed to be shifted through the medium of the throw lever 43$^a$ pivoted at 60 to the lever 48' and movable over a segment 42$^b$ carried by the lever 48'. The lever 43$^a$ is provided with a latch device 44$^a$ whereby it may be locked in the desired angular relation to the lever 48'. The device just described provides means to reduce the speed of rotation with increased power or vice versa, or to reverse the direction of rotation of the drum for winding or unwinding the cable in convenient position for control of the actuating means or throw lever, as heretofore specified. In this way, the device can be operated by a single attendant subject to the conditions stated. It is of course understood that the tubular shaft revolves within the collar 45', and that the springs normally holding the tubular shaft centralized, will always retain it in inoperative position, when the throw lever is released, thus effecting the intermittent pulling operation as heretofore described.

It will thus be seen that I have provided a machine which will very effectively and quickly pull stumps, the machine being geared to develop power for pulling a moderately large stump, without waste of time, it being desirable in such instances to insure greater economy by using a light charge of dynamite on very large stumps in order to split them before pulling, rather than pull them whole, no matter what the power of the puller may be. With the mechanism shown in Figs. 7 and 8, the power applied may be increased and less speed employed so as to pull larger stumps without employing a charge of dynamite to split or loosen the same, thereby requiring the power of a motor to produce sufficient pulling strain to pull the stumps with efficiency, although, less speed will be accomplished. It is of course understood that the speed and power are dependent upon the size and style of the motor and size of the pulley employed, thereby meeting all the circumstances incident to the work to which this invention relates.

From the foregoing description taken in connection with the accompanying drawings, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having thus described my invention, what I claim as new, and desire to secure by Letters Patent, is:

1. In a power operated drum, driving connections for said drum, said driving connections comprising a worm shaft, opposed friction disks, a sleeve slidably mounted upon said shaft and supporting said disks, a drive shaft, a friction drive disk alternately engageable with the first mentioned disks, spring controlled means for normally holding the opposed disks out of contact with the friction drive disk and means to alternately move said disks into engagement with the drive disk.

2. In a power operated drum, driving connections for said drum, said driving connections comprising a worm shaft, a sleeve slidably keyed thereon, opposed friction disks carried by the sleeve, a friction drive disk between the opposed disks and alternately engageable therewith incident to the longitudinal movement of the sleeve upon the worm shaft, and spring operated adjustable means normally retaining the opposed disks in neutral position out of engagement with the drive disk.

3. In a power operated drum, driving connections for said drum, said driving connections comprising a worm shaft, a sleeve slidably keyed thereon, means limiting the movement of the sleeve longitudinally of the worm shaft, opposed friction disks carried by the sleeve, a friction drive disk located between the opposed friction disks, and means coacting with the movement limiting means normally maintaining the opposed disks in a neutral position out of engagement with the drive disk.

4. In a power operated drum, driving connections for said drum, said driving connections comprising a worm shaft, a slotted sleeve slidably keyed upon the worm shaft, a pin carried by the shaft slidably engaged in the slot of the sleeve for limiting the movement thereof, opposed friction disks carried by the sleeve, means coacting with the pin to maintain the opposed disks in a predetermined position, and a friction drive disk located between the opposed disks and alternately engageable thereby.

5. In a power operated drum, driving connections for said drum, said driving connections comprising a worm shaft, a sleeve slidably keyed thereon, opposed friction disks carried by the sleeve, a friction drive disk located between the opposed disks and means resiliently maintaining the opposed disks in a neutral position out of engagement with the drive disk, and means for actuating the sleeve to alternately bring the opposed disks in coöperative relation with the drive disk.

6. In a power operated drum, driving connections for said drum, said driving connections comprising a worm shaft, a sleeve slidably keyed thereon, opposed friction disks carried by the sleeve, a friction drive disk located between the opposed disks and alternately engageable thereby, spring operated means normally maintaining the sleeve in a neutral position disposing the opposed disks out of engagement with the drive disk, means to actuate the sleeve to alternately bring the opposed disks into engagement with the drive disk, and means for shifting the drive disk to vary the point of contact thereof with the opposed disks.

In testimony whereof, I affix my signature hereto.

GAIL H. HINES.